United States Patent
Welch et al.

[11] Patent Number: 5,927,990
[45] Date of Patent: Jul. 27, 1999

[54] FIREFIGHTING TRAINER

[76] Inventors: Mike Welch, 2675 Vuelta Grande Ave., Long Beach, Calif. 90815; Mike Dingillo, 6536 Via Del Prado, Chino Hills, Calif. 91709

[21] Appl. No.: 09/055,131

[22] Filed: Apr. 1, 1998

[51] Int. Cl.⁶ .......................... G09B 19/00; A62C 39/00
[52] U.S. Cl. ..................... 434/226; 434/219; 454/357
[58] Field of Search ........................ 434/219, 226; 432/19; 454/342, 357, 369

[56] References Cited

U.S. PATENT DOCUMENTS

| | | | |
|---|---|---|---|
| 1,063,068 | 5/1913 | Rose | 454/362 |
| 4,001,949 | 1/1977 | Francis . | |
| 4,526,548 | 7/1985 | Livingston . | |
| 4,821,473 | 4/1989 | Cowell | 52/218 |
| 5,181,851 | 1/1993 | Layton . | |
| 5,226,818 | 7/1993 | Feiock et al. | 434/226 |
| 5,266,033 | 11/1993 | Rogers et al. . | |
| 5,316,484 | 5/1994 | Layton et al. . | |
| 5,518,402 | 5/1996 | Tommarello et al. | 434/226 |
| 5,518,403 | 5/1996 | Luftig et al. . | |

OTHER PUBLICATIONS

Flashover which is a copy of an article appearing in the publication "Firehouse".

Primary Examiner—Robert A. Hafer
Assistant Examiner—Michael B. Priddy
Attorney, Agent, or Firm—James E. Brunton

[57] ABSTRACT

A method and apparatus for training firefighters. The apparatus is uniquely designed to realistically simulate both the precursor indications of the flashover phenomena as well as flashover phenomenon itself. Because the trainees are positioned within the apparatus, the first hand training method of the invention teaches the trainee, not only how to recognize the warning signs of flashovers, but also teaches the trainee what follows these warning signs and what to do if confronted with the warning signs. The training apparatus of the invention is of a simple but durable construction which provides a high degree of safety to the trainees and is one which can be provided to fire departments at relatively low cost.

17 Claims, 5 Drawing Sheets

FIREFIGHTING TRAINER

BACKGROUND OF THE INVENTION

1. Field of the Invention

The present invention relates generally to fire simulation apparatus for training fire fighters. More particularly, the invention concerns a trainer which is operable to produce an indication of a flashover.

2. Discussion of the Prior Art

"Flashover" relates to the spontaneous combustion of objects and gases within a structure, which have been heated to their ignition temperature primarily due to the build up of heat by thermal radiation feedback. Radiation feed back results during a major fire due to the fact that heat from the fire is absorbed by the ceiling and walls of the structure and then is reradiated back into the room. When the ignition point is reached ignition occurs and the entire area becomes enveloped in fire. Often, flashover manifests in itself in the form of a fire ball which explodes downwardly from the ceiling of the structure and which can attain temperatures of up to 2000° Fahrenheit.

In many instances, flashovers occur during the first five to ten minutes of a fire, which is generally about the time fire fighters are arriving on the scene and are commencing search and rescue efforts and are attempting to advance lines into the structure. Because of the intense heat involved and the downward explosion of the fireball, flashovers can have a profound impact in the safety of the firefighters at this particular critical time in the firefighting effort and fatalities are not uncommon. For this reason there have been a number of attempts in the art to develop realistic training programs and facilities to acquaint firefighters with the hazards of flashover and to allow them to witness first hand the tell tale indications that immediately proceed a deadly flashover occurrence.

Live firefighter training has been in existence for a number of years and several types of firefighting simulator systems have been suggested in the past. Exemplary of such systems is that described in U.S. Pat. No. 4,001,949 issued to Francis. The thrust of the Francis invention is to provide a method and system for creating realistic on-line fire responses in accordance with the accuracy of an on-line fire fighting sequence employed by a fire fighter, including the steps of dynamically simulating the occurrence of an actual fire, establishing a predetermined fire fighting sequence to be followed by the fire fighter for properly extinguishing the simulated fire, monitoring the actual on-line fire fighting sequence employed by the fire fighter in fighting the simulated fire, comparing the actual fire fighting sequence employed by the fire fighter with the predetermined proper fire fighting sequence, and providing a reaction in accordance with a correspondence between the actual on line fire fighting sequence employed by the fire fighter and the predetermined fire fighting sequence to provide realistic on-line fire responses.

Another method and apparatus for training firefighters is disclosed in U.S. Pat. No. 5,316,484 issued to Layton et al. This disclosure is somewhat more pertinent to the present invention since Layton et al suggests a system and method for providing a simulation of a flashover condition that can occur during the course of suppression of a live fire. The flashover simulation is implemented by selectively supplying and igniting fuel to an auxiliary or flashover fuel burner assembly positioned adjacent the ceiling of the burn room of a firefighter trainer. Preferably, the flashover simulation is implemented only upon attainment of a threshold value of one or more pre-selected trainer operational parameters that are monitored throughout the course of a training scenario. Preferred trainer operational parameters for such monitoring include flame height at a main burner assembly and air temperature adjacent to or near a ceiling portion of the burn room.

U.S. Pat. No. 5,518,403 issued to Luftig et al discloses a fire fighting trainer for use in training firefighters about ceiling roll over fire. The Luftig trainer includes a chamber with a ceiling and includes a burner head subassembly and includes a burner control subassembly. The burner head subassembly has a fuel gas inlet pipe and an adjacent combustion air inlet pipe to produce an air/gas mixture which creates a flame at the ceiling. The burner control subassembly selectively increases the fuel gals flow to make the produced flame have a ceiling rollover effect.

Another type of firefighting trainer is disclosed in U.S. Pat. No. 4,526,548 issued to Livingston. The Livingston inventions somewhat novel in that it concerns a mobile firefighting trailer which is provided with a plurality of rooms and passageways within which simulated furniture pieces and appliances are located.

While the prior art firefighting trainers and methods have been generally beneficial in training firefighters how to fight fires, they have not been entirely effective in providing realistic simulation of the precursors of the deadly "flashover" phenomenon which takes the lives of several firefighters each year. It is particularly this drawback of the prior art systems which the methods and apparatus of the present invention seeks to overcome.

SUMMARY OF THE INVENTION

It is an object of the present invention to provide a method and apparatus for training firefighters in which, for the first time, the realistic simulation of the precursor indications of the flashover phenomena is made possible.

More particularly, it is an object of the invention to provide an apparatus of the aforementioned character which is safe, is operated in a highly controllable manner and yet exposes the trainee to the various realistic visual and thermal conditions which give result to a flashover.

Another object of the inventions to provide a training method which teaches the trainee, not only how to recognize the warning signs of flashovers but also what to do if confronted with these dangerous signs.

Another object of the invention is to provide a training apparatus of the character described which is of a simple reliable construction and one which can be provided to fire departments relatively inexpensively.

These and other objects of the invention will be apparent from the following detailed description of one form of the invention.

DISCUSSION OF THE INVENTION

Referring to the drawings and particularly to FIGS. 1, 2, 3, and 5A and 5B, one form of the dynamic flashover simulator of the present invention is there illustrated and generally identified by the numeral 14. The flashover simulator of the invention is designed for specialized training of firefighters by creating within the simulator realistic flashover precursor indications and for then creating an actual flashover for witnessing by the trainee who are positioned within the training container portion of the apparatus.

Figure 1:
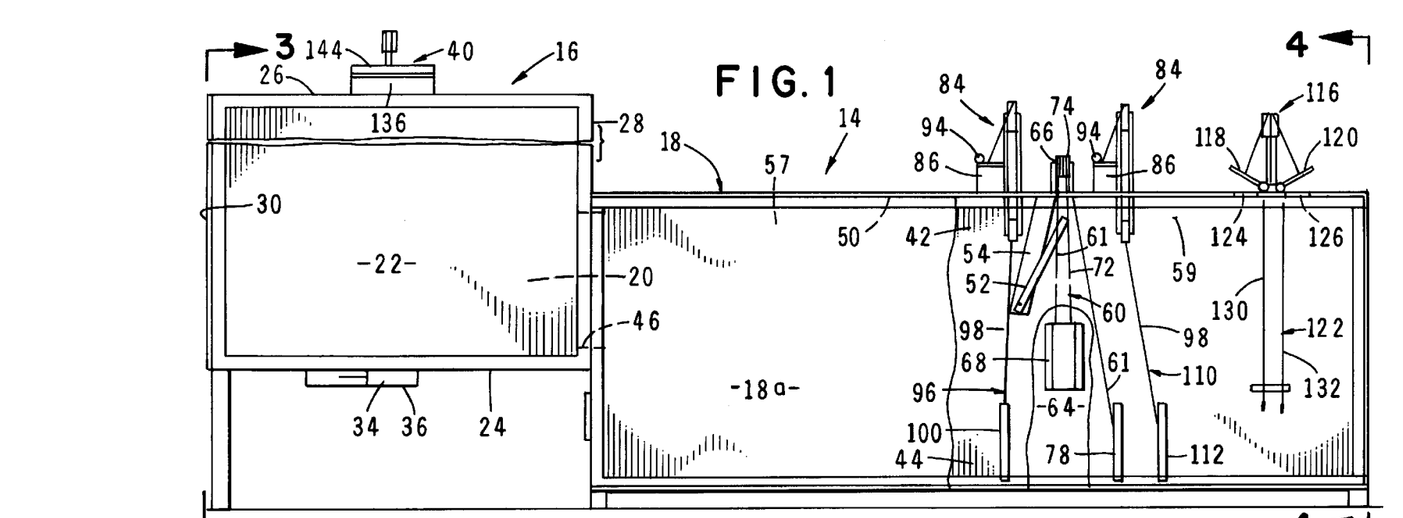
FIG. 1 is a side-elevational view of one form of the training apparatus of the present invention.
Figure 2:
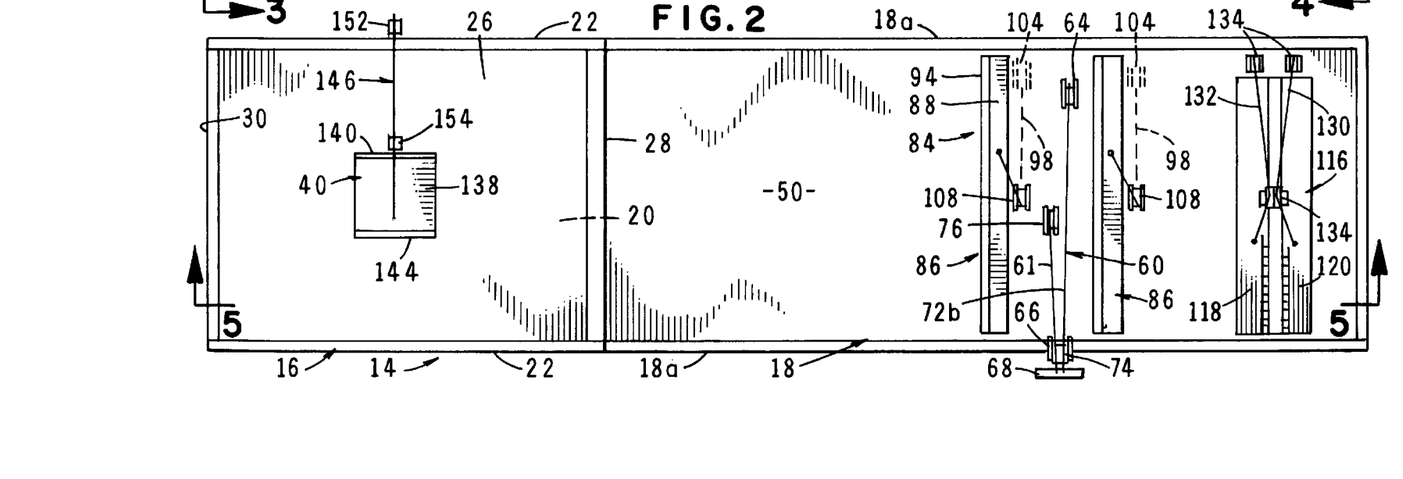
FIG. 2 is a top plan view of the apparatus shown in FIG. 1.
Figure 3:
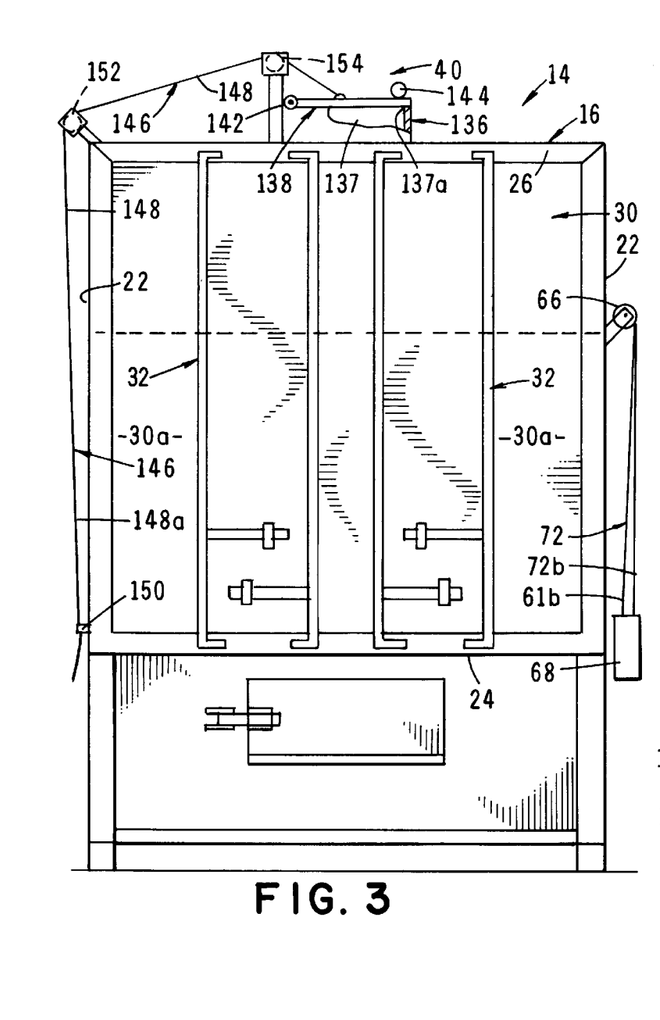
FIG. 3 is a view taken along lines 3—3 of FIG. 1.

As seen in FIGS. 1 and 2, the dynamic flashover simulator comprises a burn container 16 and a training container 18 which is operably interconnected with the burn container in an end-to-end relationship. Formed within burn container 16 is a burn chamber 20 (FIG. 5A) for burning a wide variety of combustible materials including particle board. Preferably a particle board is chosen in which the particle bonding contains formaldehyde. Burn chamber 20 is defined by non-combustible sidewalls 22, a firebrick floor 24, and a non-combustible, vented ceiling 26 (FIG. 3). As best seen in FIG. 1, chamber 20 also includes inboard and outboard end walls 28 and 30 respectively. End wall 30 is provided with access doors 30a (FIG. 3) which are operated by manipulation of bracket assemblies 32. Provided in floor 24 if the burn chamber downwardly depending chamber 34 having a door 36 which permits easy removal of the residue formed by burning combustibles. Provided in the ceiling 26 of burn chamber 20 is vent means shown here as a manually operated vent assembly 40 which is operable to vent smoke and gases from the burn chamber. The details of the construction of vent 40 as well as other vent means of the apparatus will presently be discussed.

Figures 5A, 6:
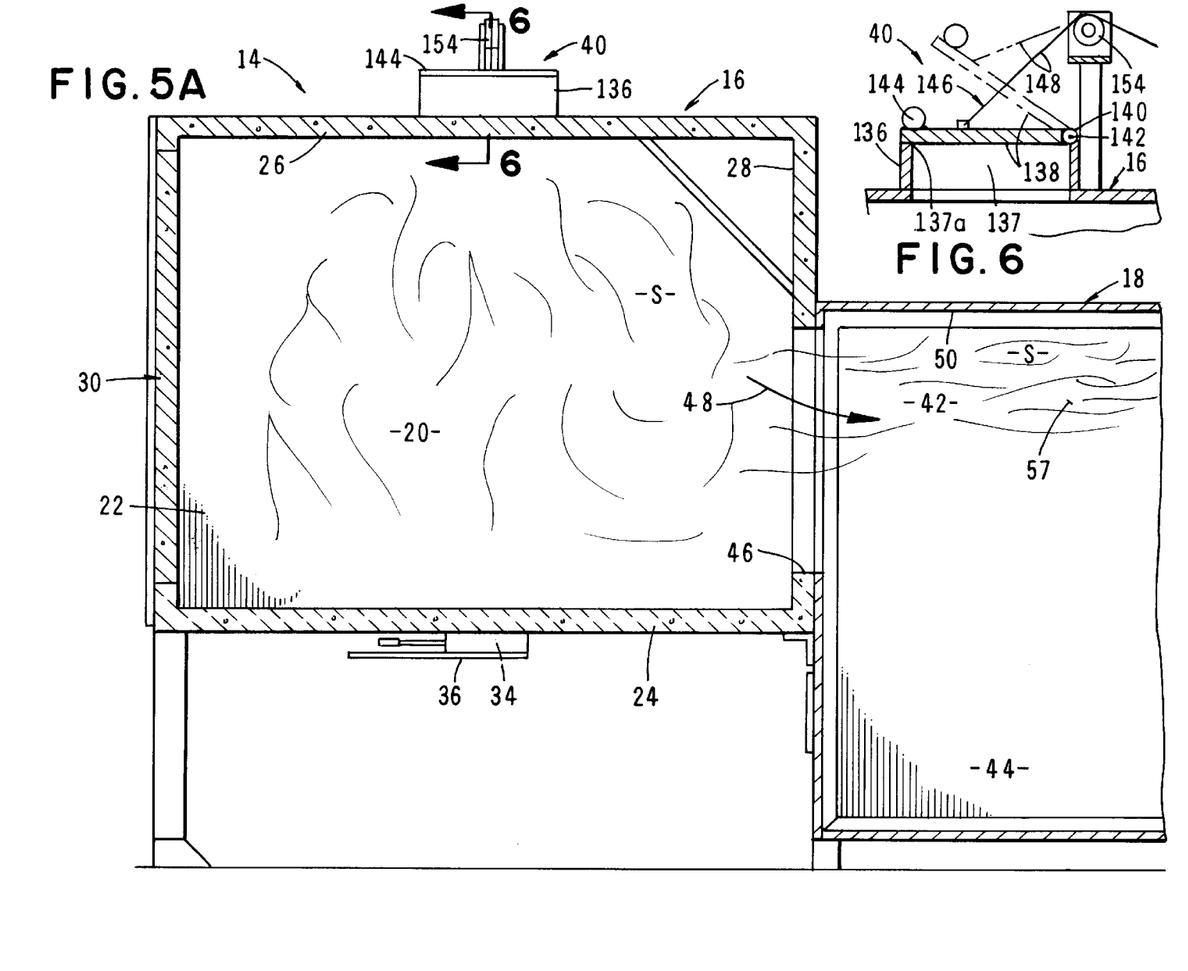
FIGS. 5A and 5B when taken together comprise a cross-sectional view taken along lines 5—5 of FIG. 2.
FIG. 6 is a cross-sectional view taken along lines 6—6 of FIG. 5A.

The training container 18 of the form of the invention shown in the drawings includes side walls 18a which cooperate to define an upper portion 42 and a lower portion 44. As illustrated in FIG. 5A, upper portion 42 of the training container is in communication with burn chamber 20 via a smoke passageway 46 formed in inboard wall 28 of burn container 16. With the construction, shown, when the combustibles within burn chamber 20 are burning, smoke and heated gases will flow from the burn chamber 20 into the upper portion of the training container in the direction of the arrow identified in FIG. 5A by the numeral 48.

Depending from the ceiling 50 of training container 18 is the important smoke blocking means of the invention which is here provided in the form of a downwardly depending blocking curtain 52. Curtain 52 is pivotally connected to a supporting frame 54 which depends from the ceiling and is movable from a first substantially closed position shown by the solid lines in FIG. 5B to a second open position shown by the phantom lines in FIG. 5B. Smoke curtain 52 serves to divide upper portion 42 of training container 18 into a forward portion generally designated as 57 and a rearward portion generally designated as 59. As indicated in FIG. 5B, when the smoke blocking means or smoke curtain 52 is in its first closed position, the curtain effectively blocks flow of the smoke and other heated gases "S" into the rearward upper portion 59 of the training container and causes the smoke and heated gases to build up within the forward portion 57 of the training container as a function of time.

Figure 10:
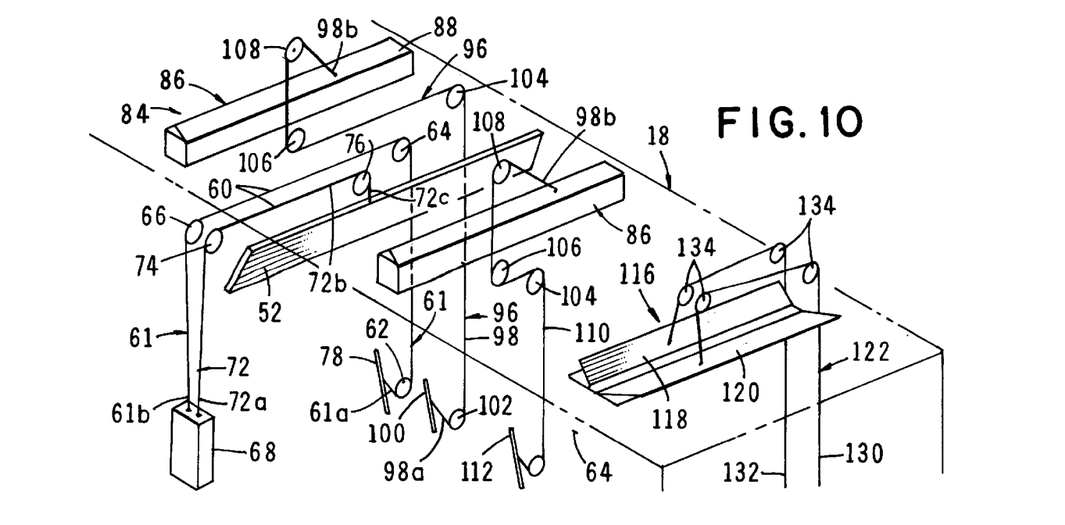
FIG. 10 is a generally perspective, diagrammatic representation of the various pulley systems of the apparatus for controlling the vent means and the smoke blocking curtain.

Also forming an important aspect of the apparatus of the present invention is the operating means for operating the smoke blocking means or smoke curtain 52. This operating means here comprises an operating cable system 60, including an elongated cable 61, which is interconnected with smoke curtain 52 via a pulley arrangement which is of the character best seen in FIG. 10. As shown in FIG. 10, the lower end 61a of cable 61 is entrained under a pulley 62 and extends upwardly through the interior of the training container 18. The cable then passes over a second pulley 64 which is disposed proximate the ceiling 50 of the container. The cable then extends transversely of the container, over a third pulley 66 and downwardly along the outside wall 64 of the training container 18. End 61b of cable 61 is interconnected with biasing means, shown here as a weight 68, which functions to continuously urge the smoke curtain 52 into the upward, closed position shown by the solid lines in FIG. 5B. A second cable 72 also forms a part of the cable assembly or system 60 and includes a first end 72a which is connected to weight 68. Additionally, cable 72 includes an intermediate portion 72b which is entrained about pulleys 74 and 76 in the manner shown in FIG. 10 and a second end 72c. Second end 72c is connected to smoke curtain 52 in the manner shown in FIGS. 4, 7, and 10 so that the biasing means or weight 68 will function to continuously urge the curtain 52 into the upward closed position.

Figures 5B, 9:
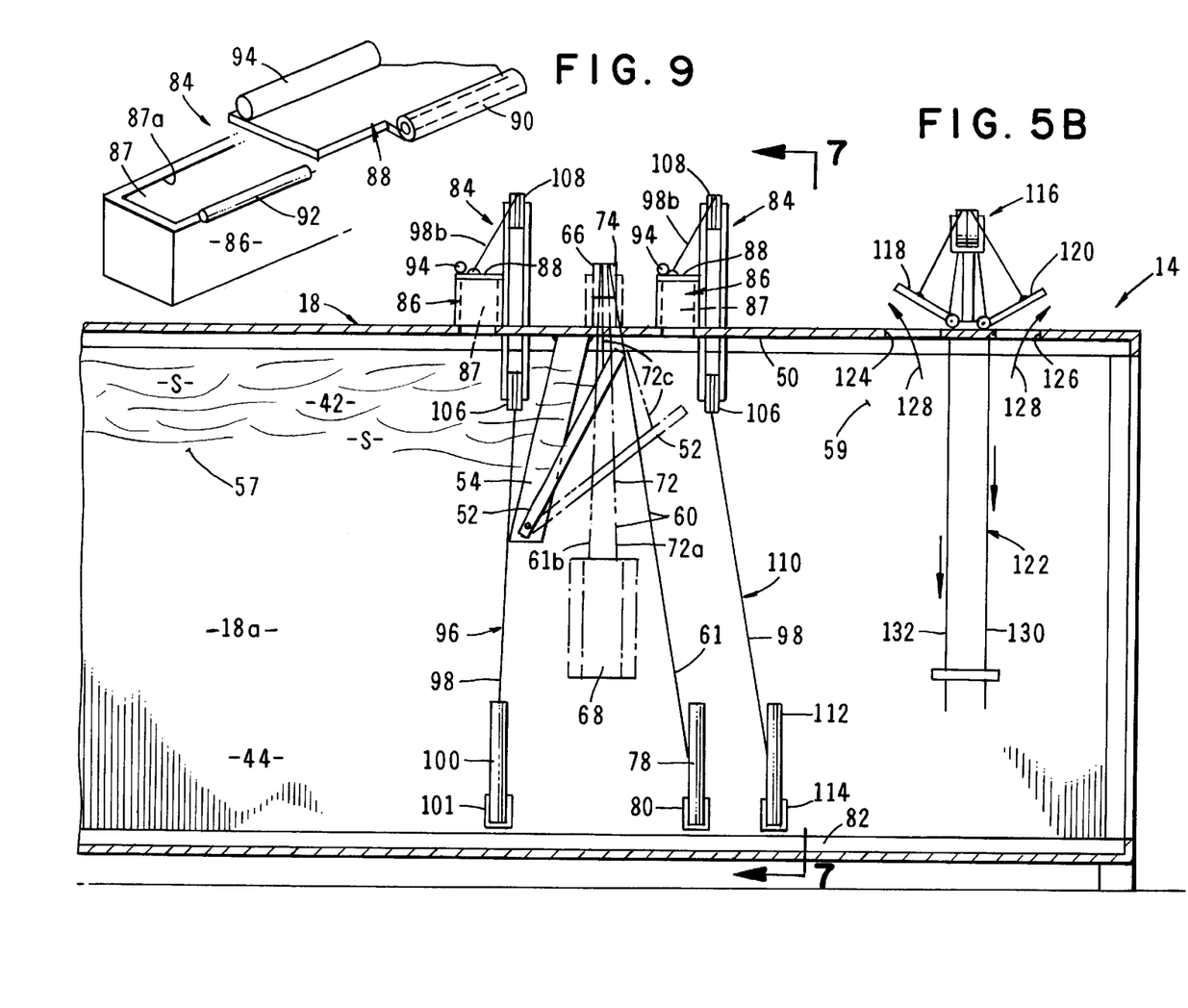
FIG. 9 is a generally perspective, fragmentary view illustrating the typical construction of the various damper assemblies of the apparatus of the invention.
Figures 7, 8:
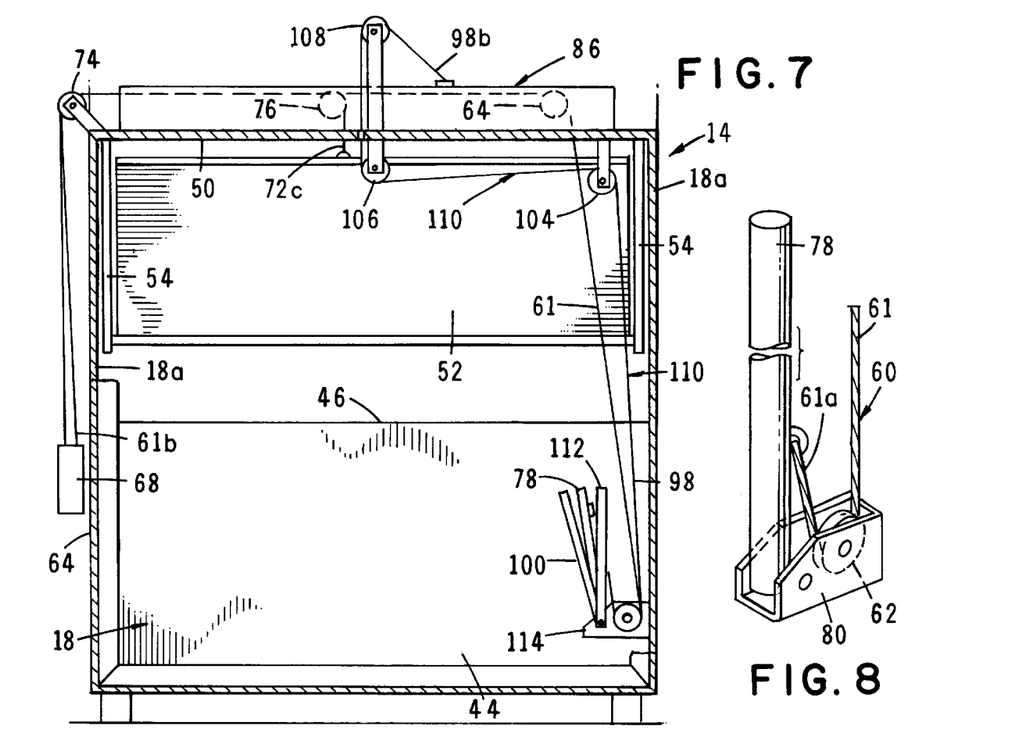
FIG. 7 is a cross-sectional view taken along lines 7—7 of FIG. 5B.
FIG. 8 is a fragmentary, generally perspective view of one form of the biasing means of the invention for biasing the surface blocking curtain toward a closed position.

Also forming a part of the operating means in the present form of the invention is an operating handle 78 which is pivotally connected to a bracket 80 (FIG. 8) which is, in turn, connected to the floor 82 of the training container (FIG. 9). As indicated in FIGS. 8 and 10, end 61a of cable 61 is connected to handle 78 so that a downward pivotal movement exerted on handle 78 will cause a shortening of the cable system in a manner to permit smoke curtain 52 to be controllably lowered toward the second position shown by the phantom lines in FIG. 9 wherein the cable is spaced apart from the ceiling 50 of the training container.

Also forming an important feature of the apparatus of the present invention is first vent means for venting smoke contained within the forward portion 57 of the training container to atmosphere. This first vent means here comprises a conventional, mechanically operated vent assembly 84 which is of the general construction shown in FIGS. 5B and 9. More particularly, vent assembly 84 includes a transversely extending, box-like structure 86 which defines a passageway 87 for permitting the flow of smoke from forward portion 57 of the training container to atmosphere via the outlet opening 87a of passageway 87 (FIG. 9). Passageway 87a can be opened and closed by damper assembly 88 which is pivotally connected to structure 86 in a manner best seen in FIG. 9. More particularly, damper 88 includes an elongated, generally tubular-shaped member 90 within which a pivot pin 92, which is affixed to structure 86, is telescopically receivable. With this construction, damper plate 88 can be pivotally moved from a first closed position blocking passageway 87 to an upraised position permitting the flow of heat and smoke through the passageway. To maintain damper plate 88 in a closed position, a weight, shown here as a length of cylindrically shaped pipe 94 is affixed to the vent plate along its outboard edge.

Vent operating means, including a cable assembly generally designated by the numeral 96 is operable to open and close passageway 87 by pivotally moving damper plate 88 about pivot pin 92. Referring once again to FIG. 10, cable assembly 96 includes an elongated cable 98, one end 98a of which is connected to an operating handle 100. Cable 98 passes under a pulley 102 and then extends upwardly through the interior of training container 18 where it is entrained over a second pulley 104 which is rotatably mounted to ceiling 50 of the training container. After passing over pulley 104, cable 96 extends transversely of container 18 and passes under a pulley 106. Next, the cable is entrained over a pulley 108 so that the second end 98b thereof can be interconnected with damper plate 88. With this construction, it is apparent that an outward and downward force exerted on operating handle 100 will cause a foreshortening of cable assembly 98 and a lifting of damper plate 88 from the closed position shown in FIG. 9 to an open position wherein smoke and heat can be vented to atmosphere through passageway 87. Operating handle 100 is pivotally connected to a bracket 101 which is connected to the floor of the training container and is of the same general configuration shown in FIG. 8.

The operating container of the present invention also includes a second vent means that operates to vent smoke and heat from the rearward upper portion 59 of the training container. This second venting means is of identical construction to the just described first venting means and includes a venting assembly of the same general character illustrated in FIG. 9. Because of the identical construction of the first and second venting means, where appropriate, like numbers are used in the drawings to identify like components. The cable assembly 110 of the second vent means which includes an elongated cable 98 is operated by a handle 112 which is pivotally connected to a bracket 114 (FIG. 5B) which is of similar construction of brackets 80 and 101 which have been previously described. Once again, an outward and downward movement exerted on handle 112 will foreshorten cable assembly 110 causing the damper plate of the second vent means to open to allow venting of heat and smoke to atmosphere through the vent passageway of the vent assembly.

Also provided in the training container portion of the apparatus of the invention is third venting means for venting smoke and gases from the rearward upper portion 59 of the training container. This third vent means, which is generally designated in the drawings by the numeral 116, comprises a pair of damper plates 118 and 120 which are interconnected with a cable assembly 122 which is operable to raise and lower vent plates 118 and 120 relative to passageways 124 and 126 formed in ceiling 50 of the training container (see FIG. 5B). When the damper plates 118 and 120 are raised to their open position shown in FIG. 5B, heat and smoke within the training container can flow to atmosphere in the direction of the arrows 128 shown in FIG. 5B. As best seen by referring to FIG. 10, cable assembly 122 includes first and second cables 130 and 132 respectively. Each of these cables is entrained over a pulley 134 so that a downward force exerted on cables 130 and 132 will cause an upward pivotal movement of the damper plates 118 and 120 in the manner illustrated in FIG. 10.

In addition to providing venting means to the tainting container 18, fourth vent means are provided for venting the burn chamber 20. This fourth vent means comprises the previously identified manually operated vent assembly 40 which includes a transversely extending, box-like structure 136 which defines a passageway 137 for permitting the flow of smoke from the burn chamber 20 to atmosphere via the outlet opening 137a of passageway 137 (FIGS. 3 and 6). Passageway 137 can be opened and closed by damper assembly 138 which is pivotally connected to structure 136 in a manner best seen in FIG. 6. More particularly, damper 138 includes an elongated, generally tubular-shaped member 140 within which a pivot pin 142 is receivable. With this construction, damper plate 138 can be pivotally moved from a first closed position shown in FIG. 3 blocking passageway 137 to the upraised position shown by the phantom lines in FIG. 6 permitting the flow of heat and smoke through the passageway. To maintain damper plate 138 in a closed position, a weight, shown here as a length of cylindrically shaped pipe 144 is affixed to the vent plate along its outboard edge.

Vent operating means including a cable assembly generally designated by the numeral 146 is operable to open and close passageway 137 by pivotally moving damper plate 138 about pivot pin 142. Referring to FIG. 3, cable assembly 146 includes an elongated cable 148, one end 148a of which is connected to a bracket 150 affixed to the outside wall 22. Cable 148 extends upwardly, passes over a pulley 152, and then is entrained over a second pulley 154 which is rotatably mounted to structure 136. After passing over pulley 154, cable 146 is interconnected with damper plate 138. With this construction, it is apparent that a downward force exerted on cable 146 will cause a foreshortening of the cable assembly and a lifting of damper plate 138 so that smoke and heat can be vented to atmosphere through passageway 137. The purpose for and the manner of use of the first, second, third and fourth venting means will be discussed in greater detail in the paragraphs which follow.

In operating the apparatus of the invention, the flammable materials which are to be burned in the burn container are first loaded into the container by the Fire Control Instructors in the following manner: First a 4 foot×8 foot×⅜ inch sheet of particle board is positioned against each of the side walls and burn container and a 4 foot×4 foot×⅜ inch sheet of particle board is positioned against each of the access doors 30a. This done, three 4 foot×4 foot×⅜ inch sheets of particle board are positioned proximate the ceiling of the burn container. As previously mentioned, the particle board selected for use in the burn container comprises particle board in which the particles thereof are bonded together with a formaldehyde-rich adhesive. After the chipboard is properly in position, firewood mixed with newspaper is stacked in one corner of the burn container in a quantity sufficient to fully ignite the particle board and to heat the burn container to an elevated temperature.

After the burn container is loaded with the combustible firewood, paper and particle board in the manner described in the preceding paragraph, the trainees don their protective fire clothing , namely a coat, pants, boots, gloves, helmet, hoods and a suitable mask. Next, the properly attired trainees will enter the training container and will be seated in the rearward portion of the container, that is, the portion of the container located rearwardly of the smoke blocking curtain 52. With the students and the instructors properly positioned within the training container either in a seated or prone position, the combustibles disposed within the burn chamber are ignited. The trainees are instructed to remain in a seated, prone or supine position at all times and are never permitted to stand up in the training container after ignition of the combustibles in the burn container.

Figure 4:
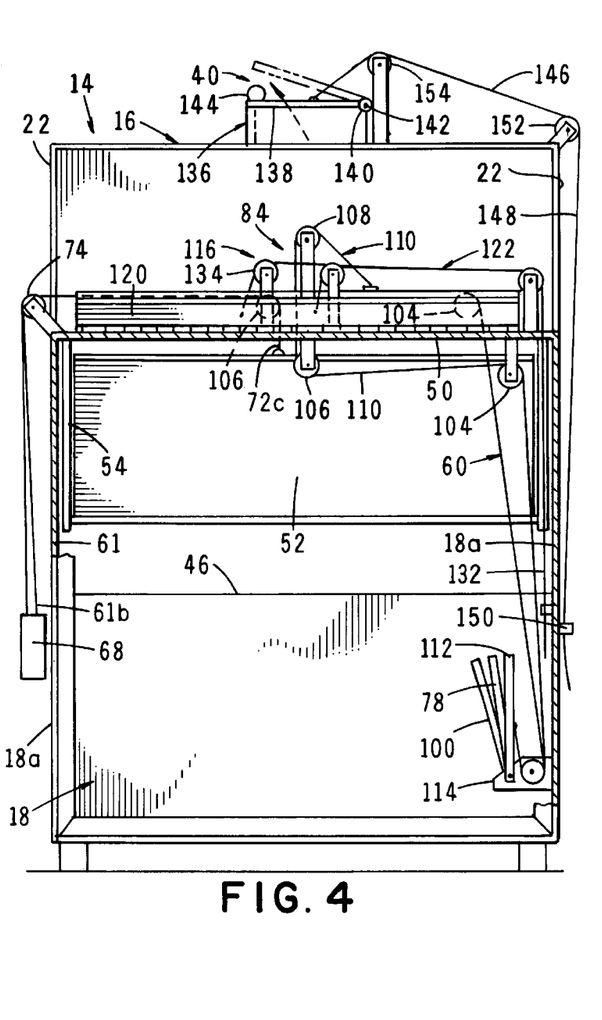
FIG. 4 is a view taken along lines 4—4 of FIG. 1.

As the combustibles within the burn chamber burn, smoke laden with carbon, carbon monoxide, carbon dioxide and formaldehyde gas will be produced in substantial quantities and will flow into the upper portion of the burn chamber 20. The smoke flowing into the training container will impinge against the smoke blocking curtain 52 which extends downwardly into the container in the manner shown in FIG. 5B. As illustrated in FIG. 4, the smoke blocking curtain extends transversely of the container so as to form a "wall" against which the smoke can buildup in the manner indicated in FIG. 5B.

As the formaldehyde laden smoke builds up against the curtain and temperatures within the burn chamber increase, the flashover precursor phenomenon known as "fire whirls" develop in the heated smoke. Immediately upon seeing the "fire whirls", the instructors will rapidly open curtain 52 so that the smoke can flow rearwardly of the container between the curtain and the ceiling 50 and in a direction over the trainees. This is, of course, accomplished through manipulation of handle 78 in a manner previously described. If, for the same reason, the "fire whirls" do not develop, the instructors will manipulate the various vent means of the apparatus to provide a controlled draft to the fire as may be necessary to encourage the faster combustion and the proper development of the fire whirls. Immediately upon opening the smoke blocking curtain the flashover will appear in the form of a ball of fire which will rapidly travel rearwardly of the training container allowing the trainees to witness first hand this deadly phenomenon. Immediately following the flashover event, the instructors will open the third vent means or vents 118 and 120 to permit the heated smoke to vent to atmosphere.

It is to be understood that the relative sizes of the burn container and the training container are such that when the proper amount of specially selected combustibles are ignited within the burn chamber and the vent means are properly manipulated, sufficient smoke and heat will be generated within the upper forward portion 57 of the training container to cause the clear development of the "fire whirls" and the ultimate flashover. By exposing the trainees positioned within the training container to these important fire phenomena, they will not only learn to be alert to the formation of the flashover precursors but will witness first hand the fireball and related high temperatures associated with the deadly flashover phenomenon.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made with out departing from the scope and spirit of the invention, as set forth in the following claims.

We claim:

1. A dynamic flashover simulator for training firefighters by creating within the simulator realistic flashover precursor indications and for then creating a realistic flashover phenomenon for witnessing by trainees positioned within the simulator, said flashover simulator comprising:
   (a) a burn container having a burn chamber for burning combustible material including materials containing formaldehyde, said burn chamber being defined by interconnected side walls, a floor, and a ceiling, said burn container having an access door and a smoke outlet;
   (b) a training container having a lower portion and an upper portion in communication with said smoke outlet of said burn container, said upper portion having a forward portion and a rearward portion, said training container further comprising:
      (i) smoke blocking means connected to said upper portion of said training container for blocking the flow of smoke through said upper portion in a manner to cause a smoke and heat build-up in said forward portion thereof sufficient to produce flashover precursors in the form of fire whirls; and
      (ii) vent means connected to said container and operable by the trainees for venting smoke from said upper portion to atmosphere.

2. A simulator as defined in claim 1 in which said training container includes a ceiling and in which said smoke blocking means comprises a smoke curtain pivotally connected to said training container proximate said ceiling for movement between a first position blocking the flow of smoke between said ceiling and said smoke curtain and a second position permitting the flow of smoke in a direction toward said rearward portion and between said ceiling and said smoke curtain.

3. A simulator as defined in claim 1 in which said burn container includes vent means for venting gases within said burn container to atmosphere.

4. A simulator as defined in claim 1 further including operating means disposed within said training container for operating said smoke blocking means.

5. A simulator as defined in claim 4 in which said smoke blocking means comprises a smoke curtain pivotally connected to said training container for movement between a first position blocking the flow of smoke toward said rearward portion and a second open position and in which said operating means comprises an operating cable assembly connected to said smoke curtain, said operating cable assembly being operable from a location within said training container to move said smoke curtain between said first and second positions.

6. A simulator as defined in claim 5 in which said operating means further comprises biasing means connected to said cable assembly for biasing said smoke curtain toward said first smoke blocking position.

7. A simulator as defined in claim 5 in which said biasing means comprises a weight connected to said cable and disposed externally of said training container.

8. A dynamic flashover simulator for training firefighters by creating within the simulator realistic flashover precursor indications and for then creating a realistic flashover phenomenon for witnessing by trainees positioned within the simulator, said flashover simulator comprising:
   (a) a burn container having a burn chamber for burning combustible material including materials containing formaldehyde, said burn chamber being defined by interconnected side walls, a floor, and a ceiling, said burn container having an access door and a smoke outlet;
   (b) a training container having a lower portion and an upper portion in communication with said smoke outlet of said burn container, said upper portion having a forward portion and a rearward portion, said training container further comprising:
      (i) a smoke curtain pivotally connected to said training container proximate said ceiling for movement between a first position blocking the flow of smoke toward said rearward portion and a second open position; and
      (ii) operating means for operating said smoke curtain comprising an operating cable assembly connected to said smoke curtain, said operating cable assembly being operable from a location within said training container to move said smoke curtain between said first and second positions.

9. A simulator as defined in claim 8 in which said training container further comprises first vent means for venting smoke contained within said forward portion to atmosphere.

10. A simulator as defined in claim 8 in which said training container further comprises second vent means for venting smoke contained within said rearward portion to atmosphere.

11. A simulator as defined in claim 8 in which said training container further includes a floor and in which said floor of said burn chamber is elevated with respect to said floor of said training container.

12. A simulator as defined in claim 8 in which said operating means further comprises biasing means connected to said cable assembly for biasing said smoke curtain toward said first position.

13. A simulator as defined in claim 12 in which said biasing means comprises a weight connected to said cable assembly and disposed externally of said training container.

14. A method for training firefighters using a dynamic flashover simulator including a burn container having interconnected walls and a ceiling defining a burn chamber for burning combustible materials, the burn chamber having a smoke outlet and a training container having a smoke inlet in communication with the smoke outlet of the burn container, the training container also having smoke blocking means for controlling the flow of smoke within the training container to create within the forward upper portion of the training container realistic flashover precursor indications and for then creating within the rearward upper portion of the training container a realistic flashover phenomenon for witnessing by trainees positioned within the training container, the method comprising the steps of:

(a) substantially lining the walls and ceiling of the burn chamber with chipboard containing formaldehyde;

(b) stacking combustible material within a portion of the burn chamber adjacent the chipboard;

(c) igniting the combustible material;

(d) operating the smoke blocking means to cause smoke and heat from the ignited combustible material to buildup within the forward, upper portion of the container so as to cause smoke whirls to appear; and (e) upon observing smoke whirls, operating the smoke blocking means to cause a flashover to occur within the upper rearward portion of the training container.

15. A method as defined in claim 14 in which the smoke blocking means of the training container comprises a smoke curtain depending from the ceiling of the training container in a manner to block smoke flow toward the rearward upper portion of the training container, the step of causing flashover to occur comprising operating the smoke blocking means to move the smoke curtain relative to the ceiling to permit smoke to flow toward the rearward, upper portion.

16. A method as defined in claim 14 in which the training container includes first vent means for venting the forward, upper portion to atmosphere and in which the step of causing smoke whirls to appear includes the step of operating the vent means to vent the forward, upper portion to atmosphere.

17. A method as defined in claim 14 in which the training container includes second vent means for venting the rearward, upper portion of the training container to atmosphere and in which the method includes the further step of operating the venting means to vent the rearward, upper portion of the training container to atmosphere.

* * * * *